Dec. 5, 1933.  M. PINE  1,937,668
CARBOY TRUCK
Filed Dec. 2, 1931  2 Sheets-Sheet 1

INVENTOR
Melvin Pine
BY
Mason Fenwick & Lawrence
ATTORNEY

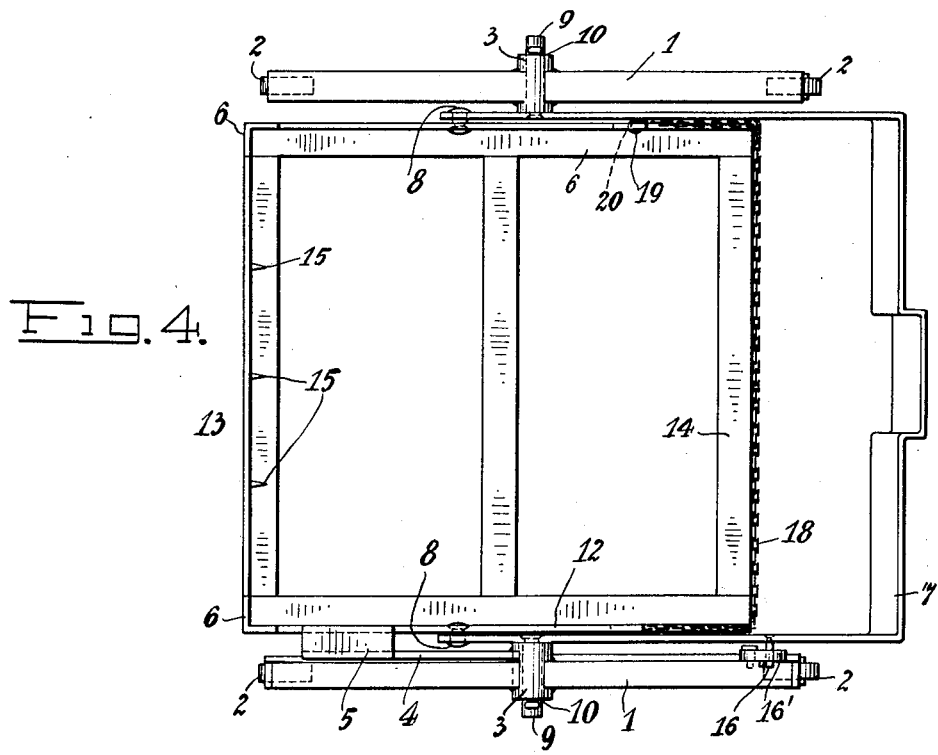
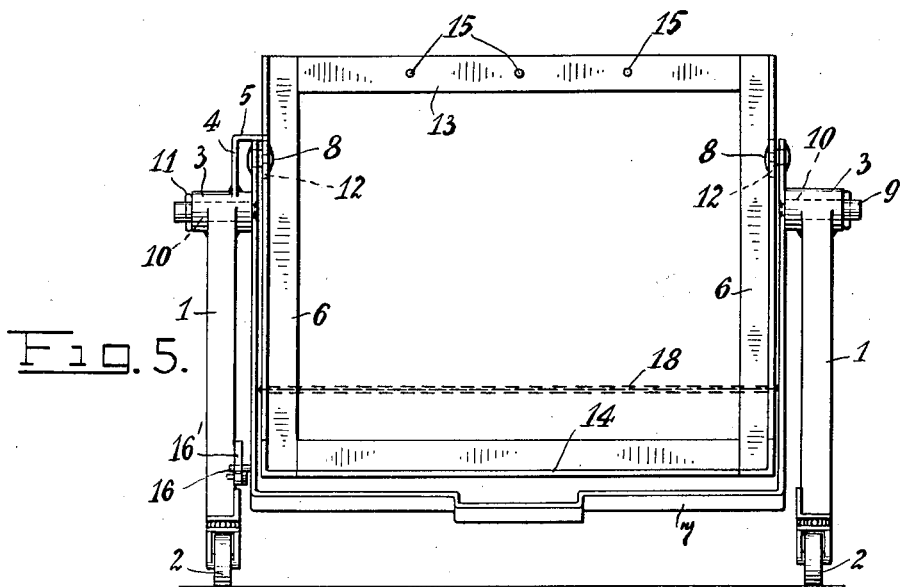

Patented Dec. 5, 1933

1,937,668

UNITED STATES PATENT OFFICE 1,937,668

CARBOY TRUCK

Melvin Pine, Jamaica, N. Y., assignor to Schwenk Safety Device Corporation, New York, N. Y., a corporation of New York Application December 2, 1931. Serial No. 578,597

3 Claims. (Cl. 254—8)

This invention relates to improvements in barrel or drum trucks, and has more particular relation to trucks for handling encased carboys.

One of the principal objects of the invention is to provide a transporting truck of light and cheap construction, and capable of transporting a carboy and allowing its contents to be readily withdrawn by the tilting of the carboy at any time.

A further object of the invention is to provide a carboy truck which may be rolled about a carboy standing on the floor to pick it up from its standing position.

A further object of the invention is to provide a carboy truck of such a nature that the encased carboy may be clamped into a swinging frame on the truck and raised or lowered in its swinging frame from or towards the floor.

The invention also has other objects, all of which will be hereinafter more particularly set forth and claimed.

In the accompanying drawings forming part of this specification,

Figure 4 represents a top plan view of my improved truck without the carboy, and Figure 5 represents an end elevation of my improved truck.

Described in general terms, the truck comprises two independently constructed horses provided with wheels or rollers a carboy holding frame or cradle and trunnion projections which are mounted in extended journal bearings of the respective horses. The assembly of the cradle and the trunnion bearings is effected by a rigid yoke which, in effect, constitutes an operating lever for raising the carboy from the floor to swinging position whereby it may be oscillated on the trunnions without touching the floor. The relation of these several parts is best seen in the disjointed Figure 2.

The effect of providing two independent roller horses that are not connected by any lateral braces except the operating yoke lever, is to leave the truck free to be rolled over and about the carboy resting upon the floor so that when the carboy is slightly tipped, the cradle may be slipped under it as it rests upon the floor and then secured in position, and the carboy and cradle raised free of the floor by the manipulation of the yoke lever which at the time would be in a vertical position.

Figure 1:
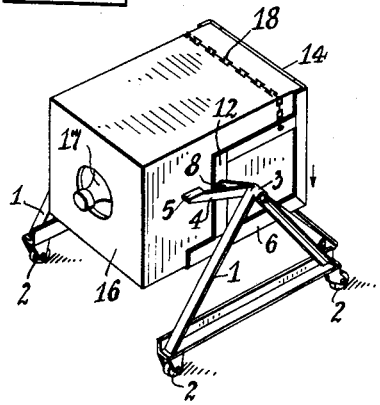
Figure 1 represents a perspective view of a truck embodying my invention, with a carboy mounted therein; the carboy being in position to pour its contents into a container resting upon the floor.
Figure 2:
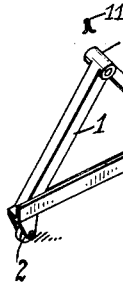
Figure 2 represents a perspective view of the three major elements of the truck separated to more clearly illustrate them.
Figure 2:
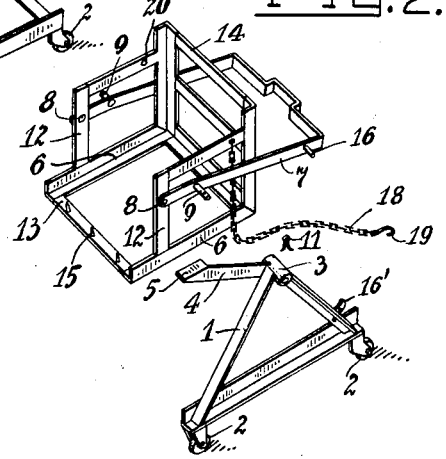

Described in detail, and referring more particularly to Figure 2, the triangular frames 1, forming the side horses, are provided with rubber tired wheels 2, so that they constitute portable horses. Each of these triangular horses is provided at the upper peak of the triangle with extended journal bearings 3, and one of the horses is provided with a stop arm 4 having a stop plate 5. The office of the extended journal bearings 3 is to give rigidity to the whole truck as when the parts are assembled, as shown in Figure 1, with the two horses 1 on opposite sides of the carboy cradle, 6, the only tie between the horses to hold them in position is the yoke lever 7. This yoke lever 7 is pivoted at its opposite ends 8 upon the cradle frame 6, and each of the side tines of the lever is provided with an extended journal stud 9. Each of these studs being apertured at its outer end as at 10, so that when the journal bearings 3 are slipped over the studs, cotter pins 11 may be dropped through the apertures of the studs to hold the cradle and the horses assembled.

Figure 3:
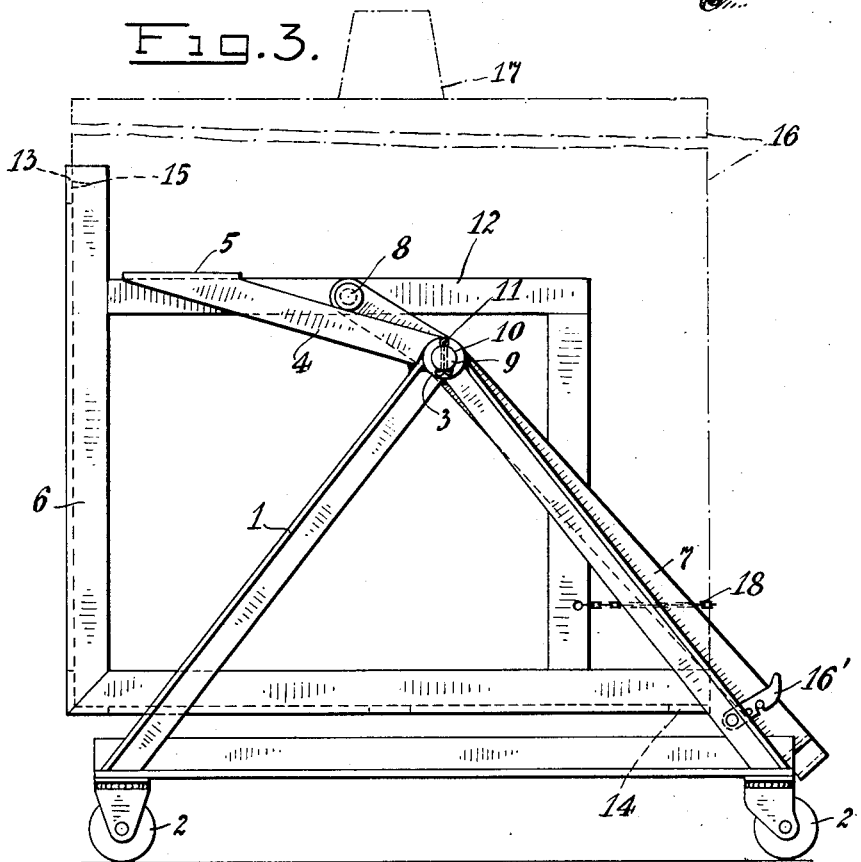
Figure 3 represents an enlarged side elevation of my improved truck, the carboy being shown in dotted lines in its vertical position.

The cradle 6, as best shown in Figure 2, is made up of side frames 12, the back frame 13, and a bottom frame 14. The side frames 12 will not extend as far as either the frames 13 or 14, and the top bar of the frame 13 is provided upon its inner side with a series of holding spikes 15, which, when the carboy is in position, bite into the wood case 16 of the carboy 17, and prevent any slipping forward of the carboy case when the entire cradle is tilted to pour the contents of the carboy into some receptacle resting upon the floor near the truck. The yoke 7 is provided with a lateral pin 16 which, when the lever is drawn into its lower position to raise the carboy in its upper position, engages a gravity latch 16', pivoted on one of the horses 1, to hold the lever in this depressed position. This, of course, will elevate the cradle into its higher position as best shown in Figure 3 and will permit the entire truck with the carboy mounted therein to be pushed about from place to place. In order to secure the carboy within the cradle and provide against possibility of displacement, a chain 18 is passed about the carboy, one end of this chain being secured to the side frames 12 and a hook 19 of the chain being hooked through an aperture 20 formed in the other side frame.

In operation, the lever 7 is first unlatched and moved to its upper position as the truck is brought into proximity to the carboy with the horses 1—1 on each side of the carboy. A slight tipping of the carboy will enable the bottom 14 of the cradle to be slipped under the bottom of the carboy and the latter tipped and pushed forward until it engages the point 15. The chain is then secured in position about the carboy case and the lever 7 drawn downward.

As the trunnions 9 become the pivotal point of the lever, the carboy 12 is thus elevated because of the pivotal connection of the ends of the lever with the cradle. The lever is latched in position as above described and the truck is ready for transportation or rolling about.

At the time that the bottom 14 of the cradle is being slipped under the tipped carboy, it is necessary to provide means against any forward tipping of the cradle that might bring it into binding contact with the floor, it being understood that when the cradle is lowered by drawing the lever 7 upward, it only rests lightly upon the floor so that the truck may be moved forward. In order to secure this nicety of adjustment between the cradle and the floor, I provide the rigid stop arm 4 having the aforesaid stop plate 5. This plate as best shown in Figure 3 holds the cradle against any further forward tipping and constitutes a stop so that the bottom of the cradle may be forced forward by rolling the truck until the carboy completely rests upon this bottom without the bottom being tipped in a manner that would cause it to dig into the floor and prevent further forward movement of the truck.

It will be seen from the above description that while the main feature of the truck is that it has two independent horses, having no rigid lateral connection whatever, these horses are held in alignment and prevented from weaving or wobbling by the large extended bearings 3 in which the trunnions 9 are mounted.

It will be seen that any tendency of either one of the horses to move out of alignment with the cradle will be resisted by an extended journal bearing connected to the rigid yoke cover and that all the advantages of moving the truck over the carboy and finally under the carboy without any interference from lateral connections, is thus secured.

It will be understood that the absence of lateral connection between the horses at the forward end allows the carboy to be tilted as shown in Figure 1, and pour its contents directly into any receptacle resting on the floor and close up against the pouring position. Further the cradle may be reversed at any time desired in its connections so that the carboy may be picked up from either direction.

Having thus described my invention, what I claim as new and desire to secure by Letters Patent is:

1. In a carboy truck, the combination with spaced independent portable horses, of a rigid pivoted yoke lever forming the only means of connection between the horses to hold them in parallel alignment, extended lateral journal bearings mounted on the respective horses, a carboy cradle pivotally connected at opposite sides to the parallel arms of the yoke lever so that the carboy may remain upright between the arms of the lever when the latter is being operated, and lateral journal studs on the opposed arms of the lever operating in the lateral journals on the horses thus bracing the horses against lateral displacement.

2. In a carboy truck, the combination with spaced independent portable horses, of a yoke lever for raising and supporting a carboy cradle and forming the only means for connecting and bracing the horses to hold them in parallel alignment, a carbon cradle located in the free space between the horses, and pivotal means connecting the arms of the lever to the opposite sides of the cradle for raising and lowering the latter with the carboy in an upright position.

3. In a carboy truck, the combination with spaced independent portable horses, of a yoke lever for raising and supporting a carboy cradle and forming the only means for connecting and bracing the horses to hold them in parallel alignment, a carboy cradle located in the free space between the horses, pivotal means connecting the arms of the lever to the opposite sides of the cradle for raising and lowering the latter with the carboy in an upright position and means for limiting the pivotal movement of the cradle in one direction.

MELVIN PINE.